US009672867B2

United States Patent
Hunt et al.

(10) Patent No.: US 9,672,867 B2
(45) Date of Patent: *Jun. 6, 2017

(54) AUTOMATED CREATION AND MAINTENANCE OF VIDEO-BASED DOCUMENTATION

(71) Applicant: International Business Machines Corporation, Armonk, NY (US)

(72) Inventors: John P. Hunt, Wake Forest, NC (US); Michael F. C. Priestley, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,376

(22) Filed: Aug. 5, 2015

(65) Prior Publication Data

US 2017/0040037 A1    Feb. 9, 2017

(51) Int. Cl.
| | | |
|---|---|---|
| H04N 9/80 | (2006.01) |
| G11B 27/036 | (2006.01) |
| G11B 27/34 | (2006.01) |
| G11B 27/00 | (2006.01) |
| G06F 17/28 | (2006.01) |
| G09B 5/06 | (2006.01) |

(52) U.S. Cl.
CPC .......... *G11B 27/036* (2013.01); *G06F 17/289* (2013.01); *G06F 17/2881* (2013.01); *G09B 5/065* (2013.01); *G11B 27/002* (2013.01); *G11B 27/34* (2013.01)

(58) Field of Classification Search
CPC .......................... G11B 27/036; G06F 17/2881
USPC .......................................................... 386/240
See application file for complete search history.

(56) References Cited

U.S. PATENT DOCUMENTS

| | | |
|---|---|---|
| 5,745,738 A | 4/1998 | Ricard |
| 8,269,817 B2 | 9/2012 | Kumar et al. |
| 8,527,272 B2 | 9/2013 | Qin et al. |
| 9,369,664 B1* | 6/2016 | Hunt ............... H04N 5/765 |

(Continued)

FOREIGN PATENT DOCUMENTS

| | | |
|---|---|---|
| EP | 1927927 A2 | 6/2008 |
| WO | 0152052 A1 | 7/2001 |

OTHER PUBLICATIONS

Casares et al., "Simplifying Video Editing Using Metadata", Carnegie Mellon University, Human-Computer Interaction Institute, School of Computer Science, 2002, pp. 1-12, <http://repository.cmu.edu/hcii>.

(Continued)

*Primary Examiner* — Hung Dang
*Assistant Examiner* — Girumsew Wengmagegn
(74) *Attorney, Agent, or Firm* — Gilbert Harmon, Jr.

(57) ABSTRACT

An approach for creation and maintenance of video-based training documentation. Universal identifiers are created and associated with user interface elements for delimiting videos and audios. Test scripts are created based on matching the universal identifiers to task instructions. Videos are created based on test scripts where the universal identifiers are marked on the videos. Audios are created based on the universal identifiers and the task instructions, where the universal identifiers are marked on the audios. The audios and the videos are combined based on synchronizing the universal identifiers.

20 Claims, 4 Drawing Sheets (56) References Cited

U.S. PATENT DOCUMENTS

| | | | |
|---|---|---|---|
| 2003/0014755 | A1 | 1/2003 | Williams |
| 2012/0177345 | A1 | 7/2012 | Trainer et al. |
| 2013/0013998 | A1 | 1/2013 | Eykholt |
| 2013/0316320 | A1 | 11/2013 | Harwar et al. |
| 2014/0033012 | A1 | 1/2014 | Dhillon et al. |
| 2015/0062353 | A1 | 3/2015 | Dalal et al. |

OTHER PUBLICATIONS

Chi et al., "DemoCut: Generating Concise Instructional Videos for Physical Demonstrations", Visualization & Video, UIST'13, Oct. 8-11, 2013, St. Andrews, United Kingdom, ACM 978-1-4503-2268—Mar. 13, 2010, pp. 141-150, <http://dx.doi.org/10.1145/2501988.2502052>.

Mirchandani et al., "Using IBM Rational Functional Tester to automate testing of globalized applications", IBM developerWorks, Sep. 25, 2007, pp. 1-11, <http://www.ibm.com/developerworks/rational/library/07/0925_mirchandani-ujjwal/>.

Petersen et al., "Learning Task Structure from Video Examples for Workflow Tracking and Authoring", IEEE International Symposium on Mixed and Augmented Reality, 2012 Science and Technology Proceedings, Nov. 5-8, 2012, Atlanta, Georgia, ©2012 IEEE, pp. 237-246.

Purdy, Kevin, "Search Hulu Videos Using Closed Caption Text", Filed to: Hulu Dec. 21, 2009, pp. 1-3, <http://lifehacker.com/5431078/search-hulu-videos-using-closed-caption-text>.

Zydron, Andrzej, "Best Practice for Using the DITA CONREF Attribute for Translation", An OASIS White Paper, for OASIS DITA Translation Subcommittee, May 18, 2015, pp. 1-7.

"Sychronizing audio and video with Merge Clips", Adobe Premier Pro Help, Copyright © 2015 Adobe Systems Incorporated, pp. 1-5, <https://helpx.adobe.com/premiere-pro/using/synchronizing-audio-video-merge-clips.html>.

Hunt et al., "Automated Creation and Maintenance of Video-Based Documentation", U.S. Appl. No. 14/970,597, filed Dec. 16, 2015, pp. 1-25.

IBM Appendix P, list of patents or patent applications treated as related, Dec. 16, 2015, pp. 1-2.

Hunt et al., "Automated Creation and Maintenance of Video-Based Documentation", U.S. Appl. No. 15/133,519, filed Apr. 20, 2016, 26 pages.

IBM Appendix P, list of patents or patent applications treated as related, Apr. 20, 2016, pp. 1-2.

Hunt et al., "Automated Creation and Maintenance of Video-Based Documentation", U.S. Appl. No. 15/373,656, filed Dec. 9, 2016, 26 pages.

IBM Appendix P, list of patents or patent applications treated as related, Dec. 15, 2016, 2 pages.

\* cited by examiner

AUTOMATED CREATION AND MAINTENANCE OF VIDEO-BASED DOCUMENTATION

BACKGROUND OF THE INVENTION

The present invention relates generally to the field of software training documentation creation and maintenance, and more particularly to the field of video training/instruction production.

Instructional video documentation is a multisensory environment with ability to convey information through auditory and visual channels. The ability to quickly and accurately produce training videos is increasingly important when coordinating in a continuous delivery software development environment and when supporting multi-lingual applications. Likewise, combining auditory and visual channels wherein the time lengths of the channels vary, aligning multiple media channels in a training video can be time consuming and error prone.

SUMMARY

As disclosed herein, a method for creation and maintenance of video-based training documentation, the method comprising the steps of: creating one or more universal identifiers, associated with one or more user interface elements, for delimiting one or more videos and one or more audios; creating one or more test scripts based on matching the one or more universal identifiers to one or more task instructions; creating one or more videos based on the one or more test scripts, wherein the one or more universal identifiers are marked on the one or more videos; creating one or more audios, based on the one or more universal identifiers and the one or more task instructions, wherein the one or more universal identifiers are marked on the one or more audios; and combining the one or more audios and the one or more videos, based on synchronizing the one or more universal identifiers. A computer system and a computer program product corresponding to the above method are also disclosed herein.

DETAILED DESCRIPTION

Video-based software documentation is preferred media, compared to printed manuals, by a range of documentation users. Video-based training/instruction can replace a user's need for extensive reading in favor of step-by-step demonstration. Embodiments of the present invention provide systems, methods, and computer program products for automatic production of training videos by using universal identifiers (UID) associated with a software product user interface (UI). Embodiments described herein use UIDs as markers to link media channels comprising video, audio and closed caption (CC) and enables the automatic creation of training videos. Further, UID markers and task instructions included in the video product can provide for finding and advancing to a desired video section.

With a variety of factors such as, but not limited to, multi-lingual needs, support for hearing impaired and continuous software delivery, the ability to quickly and accurately produce training videos is increasingly important. In addition, display dimensions on computing devices such as, but not limited to, laptops, tablets, kiosks and smart phones make usability of a single training video a challenge. Automatic video creation facilitates efficient production of alternate versions for delivery to a variety of computing devices.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when describing a particular feature, structure, or characteristic in connection with an embodiment, it is within the knowledge of one skilled in the art to affect such feature, structure, or characteristic in connection with other embodiments whether or not explicitly described.

Figure 1:
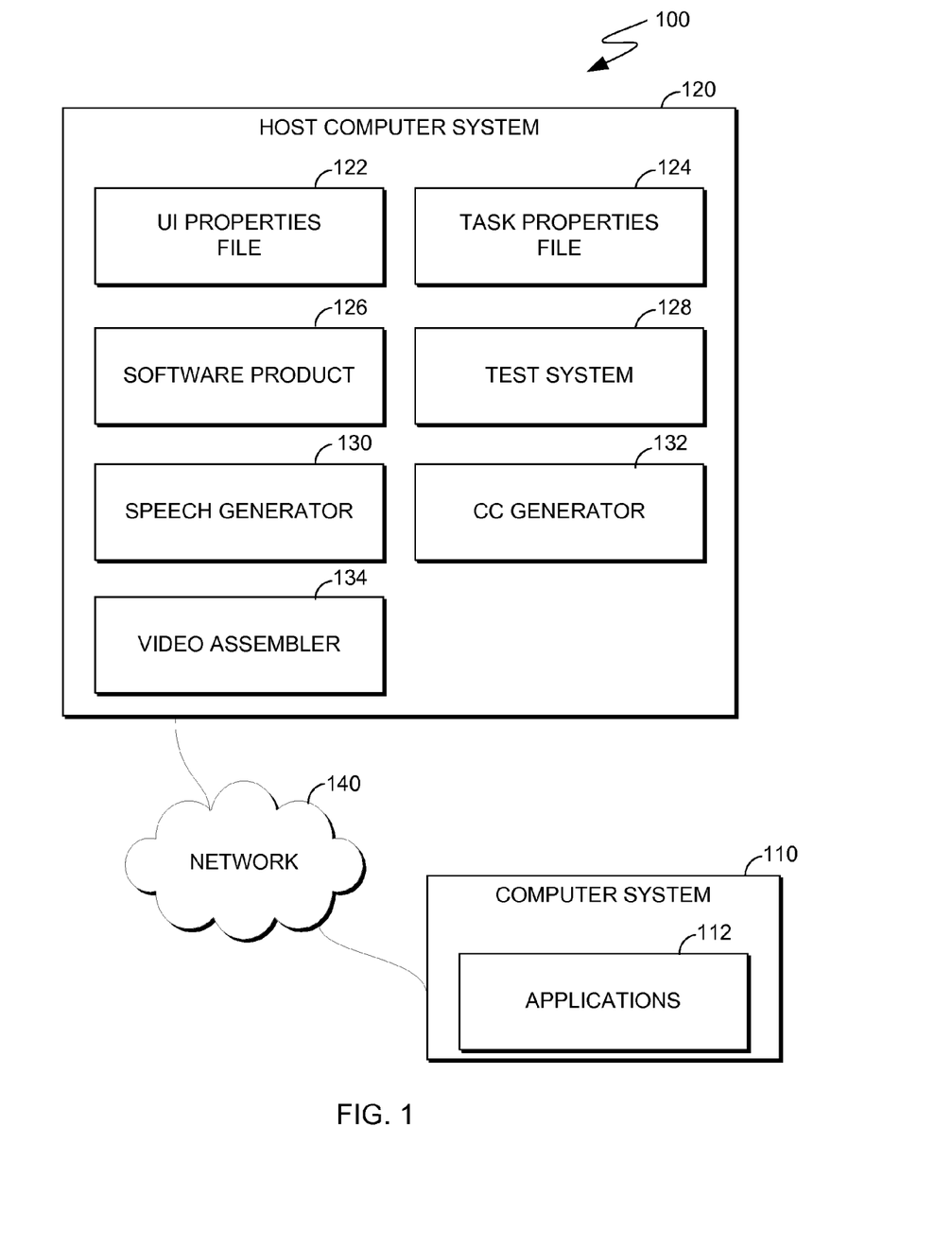
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 includes computer system 110, and host computer system 120, interconnected via network 140. Computer system 110 and host computer system 120 can be desktop computers, laptop computers, specialized computer servers, or the like. In certain embodiments, computer system 110 and host computer system 120 represent computer systems utilizing clustered computers and components acting as a single pool of seamless resources via network 140. For example, such embodiments operate in data center, cloud computing, storage area network (SAN), and network attached storage (NAS) applications. In general, computer system 110 and host computer system 120 are representative of any electronic devices, or combination of electronic devices, capable of executing computer readable program instructions, as described in detail with regard to FIG. 4.

Network 140 can be, for example, a local area network (LAN), a wide area network (WAN) such as the Internet, or a combination of the two, and include wired, wireless, or fiber optic connections. In general, network 140 can be any combination of connections and protocols that will support communications between computer system 110 and host computer system 120, in accordance with an embodiment of the present invention.

Computer system 110 includes applications 112, executing locally on the computer system and provides the capability to create, edit and manage the tools used to process any phase of an instructional video production.

In one embodiment of the present invention, host computer system 120 comprises, UI properties file 122, task properties file 124, software product 126, test system 128, speech generator 130, CC generator 132 and video assembler 134. Host computer system 120 further comprises commercial or custom software products (not shown) associated with creating and maintaining training videos. In this embodiment of the present invention, UI properties file 122 and task properties file 124 are separate, in other embodiments UI properties file and task properties file are integrated. Further, test system 128, speech generator 130, CC generator 132 and video assembler 134 can be any combination of separate or integrated tools.

In one embodiment of the present invention, UI properties file 122 can be a combination of a plurality of UI properties files. The provided UI properties file(s) 122 contains UI text for each UI element that software product 126 references as it operates, or compiles. Each UI element contains a unique identifier (i.e., variable) representing each displayed message, menu item or other language sensitive interaction with software product 126. An embodiment of the present invention uses the UI element unique identifier as a UID reference during video production. In other embodiments, a UID used for training video production can be another element associated with each software product 126 UI element.

Generally, software product 126 displays UI text by referencing an associated UI element in a UI properties file(s) 122. In support of alternate natural languages, software product 126 can reference settings such as user locale or other attributes to display appropriate UI text. For example, a menu item in software product 126 titled "Save As" in an English locale becomes "Guardar Como" in a Spanish locale. The prior example uses a UID and a locale property, in UI properties file(s) 122, to display the correct UI text.

In one embodiment of the present invention, task properties file 124 can be a combination of a plurality of task properties files. Task properties file 124 contains, in part, one or more UIDs matching UIDs contained in UI properties file(s) 122 and predetermined instructional text for a plurality of UI elements.

In one embodiment of the present invention, test system 128 operates on one or more predetermined test scripts to exercise the UI function of software product 126 and has the capability to record execution of each test to contribute the video channel of the training video. The test script references UIDs so that each UI interaction will automatically associate UI Text with UI task instructions and create UID markers accompanying the video channel. For example, a test system 128 can produce an annotation file that identifies marks along a video time scale. It should be noted that the one or more test scripts and associated one or more software product(s) 126 can be adapted to record video during a test run to accommodate readability for computing devices of varying display size such as, but not limited to, laptops, tablets, kiosks and smart phones.

In one embodiment of the present invention, speech generator 130 is a text-to-speech converter used to produce an audio channel. Speech generator 130 also marks sections of the audio channel using UIDs as defined in task properties file(s) 124.

In one embodiment of the present invention, CC generator 132 is a closed caption utility to convert task instructions from task properties file(s) 124. CC generator 132 has the capability to mark sections of the closed caption text channel using UID as defined in task properties file(s) 124. Closed caption text is further segmented using rules such as, but not limited to, maximum number of words per display screen, display pause period as defined per industry standards and the requirements of the Americans with Disabilities Act (ADA). In other embodiments, CC generator 132 produces subtitles where the audio and CC language channels differ.

Other embodiments of the present invention can preclude closed caption text in the training video.

In one embodiment of the present invention, video assembler 134 is a tool capable of merging any combination of video, closed caption and audio channels. Video assembler 134 uses UIDs available in each media channel to perform merging and synchronization of each media channel based on matching UID marks.

Figure 2:
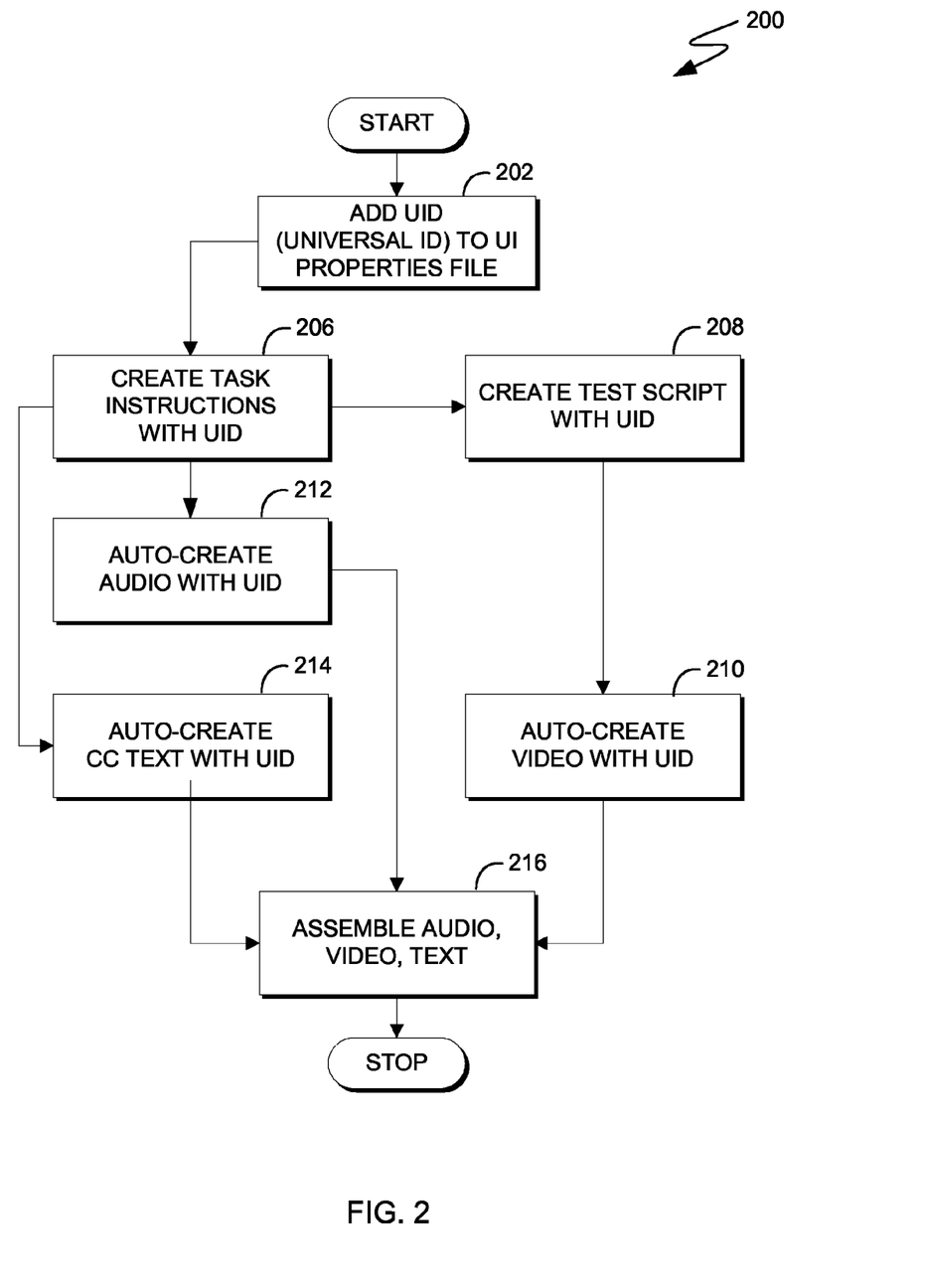
FIG. 2 is a flowchart depicting operational steps of instructional video creation and maintenance within the data processing environment of FIG. 1, in accordance with an embodiment of the present invention.

FIG. 2 is a flowchart depicting operational steps of instructional video creation, in accordance with an embodiment of the present invention. The video creation flow 200 includes assigning UID to each UI element containing UI text in UI properties file 122 in step 202. Software product 126 is the source for UI text used in step 202. The UID establishes "content referencing" linkages between UI elements such as, UI text and task instructions. It should be noted that content references can be implemented using a custom solution or by using markup languages such as, but not limited to, Extensible Markup Language (XML) or Darwin Information Typing Architecture (DITA). It should be noted when introducing alternate natural languages or refining UI text, the UI elements are translated or updated respectively without affecting an assigned UID in UI properties file(s) 122.

Step 206 creates task instructions and associated UIDs in task properties file(s) 124 based on UIDs contained in UI properties file(s) 122. The UID reference associates a task step to a UI element used by software product 126. It should be noted when introducing alternate natural languages, the task instruction text is updated without affecting an assigned UID in task properties file(s) 124.

Step 208 creates a test script that executes UI elements of software product 126 contained in UI properties file(s) 122, and references task instructions contained in task properties file(s) 124. The test script references mutual UIDs in UI properties file(s) 122 and task properties file(s) 124 in the same sequence to enable the instructional aspect of the video recording. It should be noted that the format of the test script is appropriate to the employed software testing application (e.g., IBM Rational TestManager). It should be further noted that the test script references UIDs in UI properties file 122 and task properties file 124 so that test script content is not affected when supporting alternate natural languages, refining task instructions or refining user interface elements.

In step 210, the test script provided in step 208 runs against software product 126 with recording enabled. The recorded test run by test system 128 automatically generates the video channel of the training video. In one embodiment, each UID acts as a marker in a single video produced by a test run. In other embodiments, the test run can produce a plurality of videos ranging in one or more UID markers. It should be noted that UID markers also establish reference points in the video to support advance and rewind capabilities.

Step 212 converts the task instructions from step 206 to speech using speech generator 130. In one embodiment, audio is marked based on encountering each UID and in another embodiment an audio file is create for each UID. It should be noted that a new audio channel is created for alternate natural language or when refining task instructions.

Step 214 converts task instructions from step 206 to closed caption format. Closed caption standards limit font size and number of characters per screen. There are one or more closed caption segments per UID. In one embodiment, the CC generator 132 marks closed caption text based on encountering each UID, in another embodiment the CC generator 132 creates a closed caption file for each UID. It should be noted that a new closed caption channel is created for alternate natural language or when refining task instructions.

Figure 3:
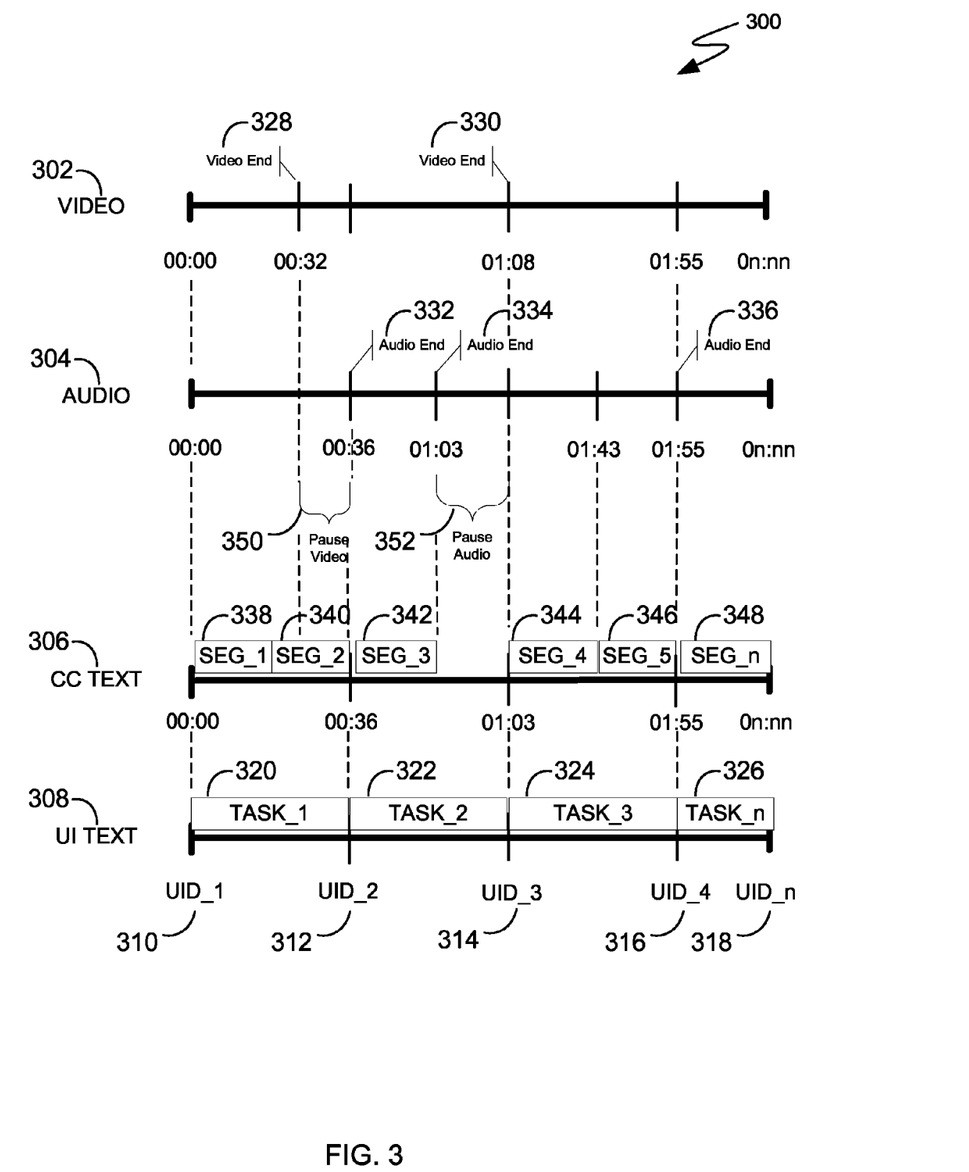
FIG. 3 depicts a sample of universal identifier based synchronization of media channels comprising the components of a produced video, in accordance with an embodiment of the present invention.

In step 216, a video channel created in step 210 has other media channels added from step 212 and step 214. The video assembler 134 tool uses UID to synchronize video, audio and closed caption channels. The UID markers allow synchronization of media channels and establishment of reference points to support advance and rewind to select points in a video using search or other media playback controls. It should be noted that new video is created and is adaptive to deliver different versions for, but not limited to, alternate natural languages, alternate devices (e.g., laptop, smart phone) or when refining task instructions FIG. 3 depicts a sample of UID synchronization of media channels comprising the components of a video produced by video assembler 134. This synchronization time line 300 illustrates one of many possible techniques to synchronize media channel end times, the use of UID_n 318 establishes alignment points for each media channel and thereby enables automatic training video creation.

UI text 308 scale represents UID established in UI properties file(s) 122 where UID_1 310, UID_2 312, UID_3 314, UID_4 316, UID_n 318 are markers of software product 126 UI text and 'n' indicates one to many possible UID. The UID markers establish reference points to align sections of media channel and to support advance or rewind to select points in a video. Note that UI text 308 scale is not time based until synchronization of media channels is complete.

Further depicted on UI text 308 scale are task_1 320, task_2 322, task_3 324 and task_n which represent instructional task text associated with the UID in task properties file(s) 124 and where 'n' indicates one to many possible tasks.

In the context of managing synchronization between the media channels, embodiments of the present invention describe the use of UID_n 318 as markers within each channel (video 302, audio 304, and cc text 306) and those markers establish the starting point of each media channel section or segment. In the example, where end times do not align between associated media channels, video assembler 134 establishes a pause. For example, video end 328 is 00:32 on video 302 where audio end 332 is 00:36, thus video assembler 134 generates a pause video 350 (freeze frame) action to support completion of audio end 332. Conversely, UID_2 audio end 334 is 01:03 while video end 330 is 01:08, thus pause audio 352 (silence) action is taken.

For cc text 306, audio end 332, audio end 334, and audio end 336 are aligned with the ends of cc text seg_2 340, seg_3 342, seg_5 346 respectively. CC generator segments closed caption to predetermined rules of number of words for screen and font size. As depicted, seg_1 338 and seg_2 340 constitute task_1 320 as task_1 text requires splitting into 2 segments to meet closed caption rules. Further, audio end 332 has playback pacing aligned with reading pacing as defined in cc text 306 rules and since seg_2 340 is already displayed during pause video 350, there is no impact on the closed caption channel being displayed during pause video 350. Once audio end 332 occurs then UID_2 312 starts associated media channels video 302, audio 304 and cc text 306.

In another example, task_2 322 has a shorter audio end 334 than video end 330 thus seg_3 342 is correspondingly short. It should be noted that any combination of media channel pauses are introduced to achieve media channel synchronization.

Figure 4:
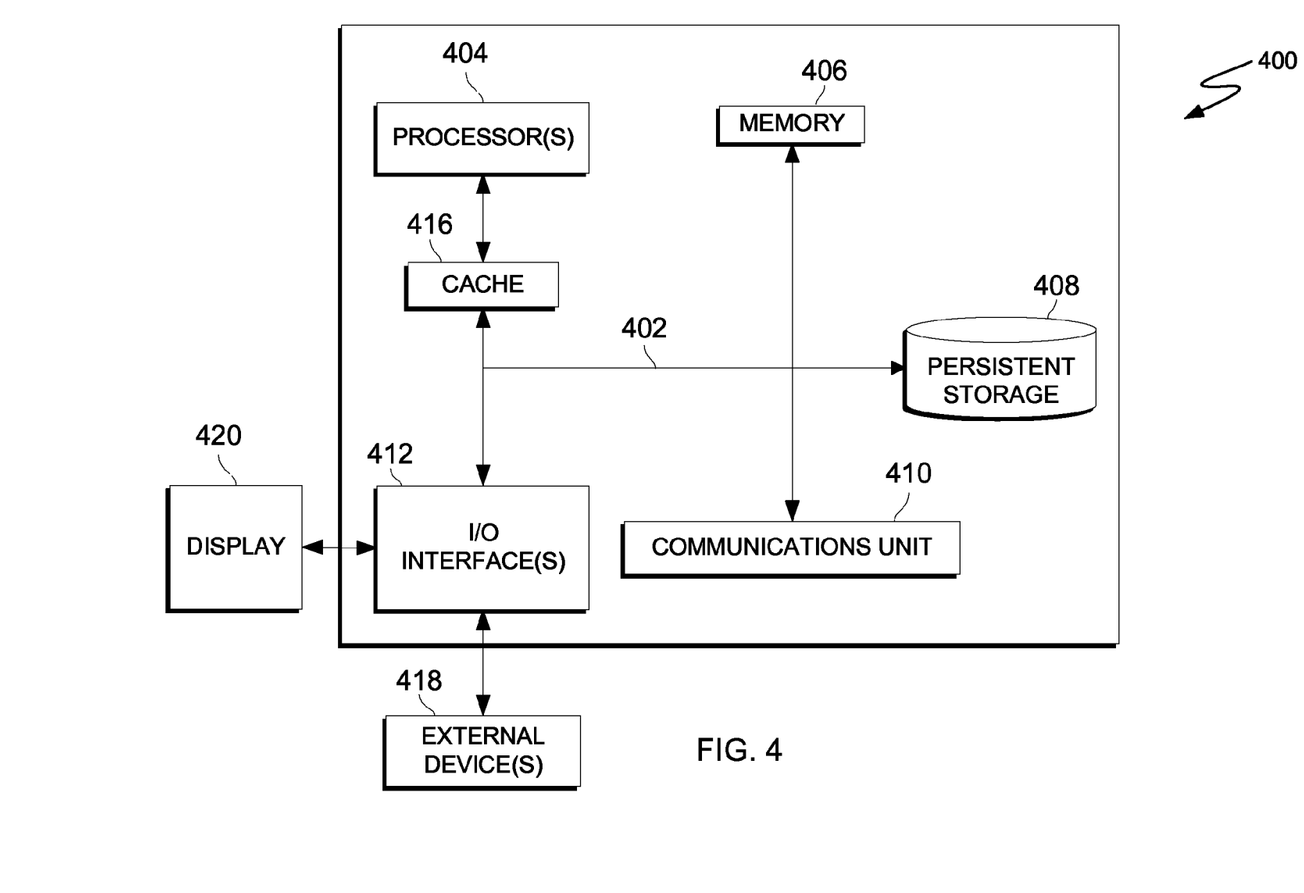
FIG. 4 depicts a block diagram of components of the host computer system, in accordance with an embodiment of the present invention.

FIG. 4 depicts a block diagram of components of the host computer system 120 in accordance with an illustrative embodiment of the present invention. It should be appreciated that FIG. 4 provides only an illustration of one implementation and does not imply any limitations with regard to the environments in which different embodiments can be implemented. Many modifications to the depicted environment can be made.

Host computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Host computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating video-based training documentation, the method comprising the steps of:
    creating one or more universal identifiers, associated with one or more user interface elements, for delimiting one or more videos and one or more audios;
    creating one or more test scripts based on matching the one or more universal identifiers to one or more task instructions;
    creating one or more videos based on the one or more test scripts, wherein the one or more universal identifiers are marked on the one or more videos;
    creating one or more audios, based on the one or more universal identifiers and the one or more task instructions, wherein the one or more universal identifiers are marked on the one or more audios; and
    combining the one or more audios and the one or more videos, based on synchronizing the one or more universal identifiers, creating a multi-channel media.

2. The method of claim 1, wherein one or more user interface properties files are comprised of the one or more user interface elements, the one or more associated universal identifiers and one or more user interface text in one or more natural languages for creating the one or more videos.

3. The method of claim 1, wherein one or more task properties files are comprised of the one or more universal identifiers and the one or more associated task instructions in one or more natural language for creating the one or more videos and the one or more audios.

4. The method of claim 1, further comprising:
    creating one or more closed caption text, based on the one or more universal identifiers and the one or more task instructions, wherein the one or more universal identifiers are marked on the one or more closed caption text; and
    combining the multi-channel media and the one or more closed caption text, based on synchronizing the one or more universal identifiers.

5. The method of claim 4, wherein the closed caption text is translated into one or more natural languages and is associated with the one or more universal identifiers.

6. The method of claim 1, wherein the one or more universal identifiers are markers for functions comprising search, advance and rewind capabilities.

7. The method of claim 1, wherein the one or more videos are adaptive to generate alternative videos based on display dimensions.

8. A computer program product for generating video-based training documentation, the computer program product comprising:
    one or more computer readable storage media and program instructions stored on the one or more computer readable storage media, the program instructions comprising:
        program instructions to create one or more universal identifiers, associated with one or more user interface elements, for delimiting one or more videos and one or more audios;
        program instructions to create one or more test scripts based on matching the one or more universal identifiers to one or more task instructions;
        program instructions to create one or more videos based on the one or more test scripts, wherein the one or more universal identifiers are marked on the one or more videos;
        program instructions to create one or more audios, based on the one or more universal identifiers and the one or more task instructions, wherein the one or more universal identifiers are marked on the one or more audios; and
        program instructions to combine the one or more audios and the one or more videos, based on synchronizing the one or more universal identifiers, creating a multi-channel media.

9. The computer program product of claim 8, wherein one or more user interface properties files are comprised of the one or more user interface elements, the one or more associated universal identifiers and one or more user interface text in one or more natural languages for creating the one or more videos.

10. The computer program product of claim 8, wherein one or more task properties files are comprised of the one or more universal identifiers and the one or more associated task instructions in one or more natural language for creating the one or more videos and the one or more audios.

11. The computer program product of claim 8, further comprising:
    program instructions to create one or more closed caption text, based on the one or more universal identifiers and the one or more task instructions, wherein the one or more universal identifiers are marked on the one or more closed caption text; and
    program instructions to combine the multi-channel media and the one or more closed caption text, based on synchronizing the one or more universal identifiers.

12. The computer program product of claim 11, wherein the closed caption text is translated into one or more natural languages and is associated with the one or more universal identifiers.

13. The computer program product of claim 8, wherein the one or more universal identifiers are markers for functions comprising search, advance and rewind capabilities.

14. The computer program product of claim 8, wherein the one or more videos are adaptive to generate alternative videos based on display dimensions.

15. A computer system for generating video-based training documentation, the computer system comprising:
one or more computer processors;
one or more computer readable storage media;
program instructions stored on the one or more computer readable storage media for execution by at least one of the one or more computer processors, the program instructions comprising:
program instructions to create one or more universal identifiers, associated with one or more user interface elements, for delimiting one or more videos and one or more audios;
program instructions to create one or more test scripts based on matching the one or more universal identifiers to one or more task instructions;
program instructions to create one or more videos based on the one or more test scripts, wherein the one or more universal identifiers are marked on the one or more videos;
program instructions to create one or more audios, based on the one or more universal identifiers and the one or more task instructions, wherein the one or more universal identifiers are marked on the one or more audios; and
program instructions to combine the one or more audios and the one or more videos, based on synchronizing the one or more universal identifiers, creating a multi-channel media.

16. The computer system of claim 15, wherein one or more user interface properties files are comprised of the one or more user interface elements, the one or more associated universal identifiers and one or more user interface text in one or more natural languages for creating the one or more videos.

17. The computer system of claim 15, wherein one or more task properties files are comprised of the one or more universal identifiers and the one or more associated task instructions in one or more natural language for creating the one or more videos and the one or more audios.

18. The computer system of claim 15, further comprising:
program instructions to create one or more closed caption text, based on the one or more universal identifiers and the one or more task instructions, wherein the one or more universal identifiers are marked on the one or more closed caption text; and
program instructions to combine the multi-channel media and the one or more closed caption text, based on synchronizing the one or more universal identifiers.

19. The computer system of claim 15, wherein the one or more universal identifiers are markers for functions comprising search, advance and rewind capabilities.

20. The computer system of claim 15, wherein the one or more videos are adaptive to generate alternative videos based on display dimensions.

* * * * *